US012600612B2

(12) United States Patent
Zhao et al.

(10) Patent No.: US 12,600,612 B2
(45) Date of Patent: Apr. 14, 2026

(54) MECHANISM FOR DRIVER HEAD ADJUSTMENT

(71) Applicant: Thermo Fisher Scientific (Shanghai) Instruments Co., Ltd., Shanghai (CN)

(72) Inventors: Junyi Zhao, Jiangsu (CN); Ting Xu, Shanghai (CN); Ronhua Chen, Jiangsu (CN)

(73) Assignee: Thermo Fisher Scientific (Shanghai) Instruments Co., Ltd., Shanghai (CN)

( * ) Notice: Subject to any disclaimer, the term of this patent is extended or adjusted under 35 U.S.C. 154(b) by 18 days.

(21) Appl. No.: 18/739,800

(22) Filed: Jun. 11, 2024

(65) Prior Publication Data

US 2024/0417232 A1 Dec. 19, 2024

(30) Foreign Application Priority Data

Jun. 13, 2023 (CN) .......................... 202310701321.3

(51) Int. Cl.
*B67B 7/02* (2006.01)
*G01N 35/02* (2006.01)
*G01N 35/04* (2006.01)

(52) U.S. Cl.
CPC ............. *B67B 7/02* (2013.01); *G01N 35/026* (2013.01); *G01N 2035/0405* (2013.01)

(58) Field of Classification Search
CPC . B67B 7/02; G01N 35/026; G01N 2035/0405
See application file for complete search history.

(56) References Cited

U.S. PATENT DOCUMENTS 4,363,204 A * 12/1982 Ohude .................. B65B 21/183
414/416.06
4,704,924 A * 11/1987 Echols ..................... B67B 7/02
81/3.4

(Continued)

FOREIGN PATENT DOCUMENTS

CN      214129827      9/2021
CN      114537876      5/2022

(Continued)

OTHER PUBLICATIONS

Extended European Search Report for European Application No. 24181931.7, mailed Mar. 11, 2025.

(Continued)

*Primary Examiner* — Anna K Kinsaul
(74) *Attorney, Agent, or Firm* — Klarquist Sparkman, LLP

(57) ABSTRACT
An uncapping apparatus for a test tube cap includes a drive head having at least two drive head elements. The drive head elements have a first section and a second section located on two opposite sides of a rotary shaft. An elastic element provides a tensioning force to the drive head elements. A switching element is movable between a first position and a second position. In the first position, the second sections are under the tensioning force of the elastic element to cause the first sections to form a first drive head size. In the second position, the switching element acts on the elastic element to change the tensioning force acting on the second sections, so that by rotation of the drive head element, the first sections form a second drive head size. A method for using an uncapping apparatus to open a test tube cap is also described.

13 Claims, 15 Drawing Sheets

(56)                    References Cited

U.S. PATENT DOCUMENTS

| | | | | |
|---|---|---|---|---|
| 5,455,006 | A * | 10/1995 | Aota | G01N 35/04 |
| | | | | 422/561 |
| 5,746,042 | A * | 5/1998 | Lombardi | B65B 7/2807 |
| | | | | 53/308 |
| 5,993,417 | A * | 11/1999 | Yerfino | A61M 5/3234 |
| | | | | 604/110 |
| 9,199,755 | B1 * | 12/2015 | Cohen | B67B 7/02 |
| 2005/0252342 | A1 * | 11/2005 | Itoh | G01N 35/04 |
| | | | | 81/3.2 |
| 2007/0098597 | A1 * | 5/2007 | Brunner | B67B 7/182 |
| | | | | 422/400 |
| 2008/0098517 | A1 * | 5/2008 | Ball | E03C 1/232 |
| | | | | 4/694 |
| 2010/0088871 | A1 * | 4/2010 | Chavez | B67B 1/045 |
| | | | | 29/278 |
| 2015/0273468 | A1 * | 10/2015 | Croquette | B01L 9/06 |
| | | | | 422/550 |
| 2015/0292986 | A1 * | 10/2015 | Frost | G01N 1/02 |
| | | | | 422/549 |
| 2020/0072858 | A1 * | 3/2020 | Hecht | B65D 39/04 |
| 2022/0024052 | A1 * | 1/2022 | Wolton | G01N 35/0099 |
| 2022/0212351 | A1 * | 7/2022 | Heimberg | B25J 15/0226 |
| 2023/0055698 | A1 * | 2/2023 | Levin | B67B 3/2006 |
| 2025/0073922 | A1 * | 3/2025 | Maffeis | B25J 9/126 |

FOREIGN PATENT DOCUMENTS

| | | |
|---|---|---|
| CN | 219136320 | 6/2023 |
| EP | 0192203 | 8/1986 |
| GB | 2329859 | 4/1999 |
| JP | 2012018007 | 1/2012 |

OTHER PUBLICATIONS

European Search Report for European Application No. 24181931.7, mailed Nov. 11, 2024.

* cited by examiner

200

MECHANISM FOR DRIVER HEAD ADJUSTMENT

CROSS REFERENCE TO RELATED APPLICATION

This application claims the benefit of Chinese Patent Application No. CN202310701321.3, filed Jun. 13, 2023, which is hereby incorporated by reference.

TECHNICAL FIELD

The present invention relates to sample testing in the field of biomedicine, and relates in particular to tools and methods for handling laboratory sample containers. Specifically, the present invention relates to an uncapping apparatus for a test tube cap. The present invention further relates to a method for using an uncapping apparatus to drive a test tube cap, e.g., to drive the test tube cap to rotate, thereby opening the test tube cap.

BACKGROUND

In many fields such as biology, medicine, chemistry, life sciences and the like, it is necessary to perform tests and analysis on a sample in a test tube by using a test and analysis apparatus after sample acquisition is completed. For this reason, uncapping needs to be performed before a sample enters a test and analysis instrument. Sometimes, due to the difficulty of sampling or the high costs of the sample itself, the sample needs to be divided into a plurality of parts stored in cryotubes for subsequent use in other studies. Before a cryotube is used, it is also necessary to remove and open a test tube cap thereof; then a sample is placed inside of the cryotube, and then the test tube cap thereof is installed.

Currently, uncapping may be performed manually or automatically by a machine. In one aspect, the manual uncapping method is inefficient, and an operator can operate only a single test tube cap at a time. In another aspect, the operator performs the operation of screwing and unscrewing the test tube cap manually for a long period of time, which may affect the flexibility of the fingers or may cause damage to the fingers. In addition, the risk of contaminating the sample in the test tube also exists. The automatic uncapping method by a machine can significantly reduce efforts of opening/closing the cap and improve working efficiency, and is characterized by not causing contamination. In particular, since cryotubes need to be uncapped or recapped frequently, various uncapping apparatuses have been widely used in laboratories to manage compound libraries and biological sample libraries so as to save experiment or storage time.

However, the majority of current uncapping apparatuses still require test tubes to be uncapped one by one, and the degree of automation and efficiency are not high. In addition, the majority of current uncapping apparatuses can only open test tube caps of the same diameter, and cannot uncap test tubes having test tube caps of different diameters. If the latter needs to be uncapped or recapped, it is typically necessary to replace a drive head of the uncapping apparatus or other components acting directly on the test tube caps. Such a replacement also requires a large amount of experimental time and large costs.

For this reason, in the prior art, uncapping apparatuses that can be adapted to a wide variety of different test tube caps have been developed. For example, the patent document U.S. 20070095024 A1 discloses an uncapping system, wherein the relative position of gripper arms is changed by one or more rotary cams, so that gripper arms on one or two plates of each set moves relative to gripper arms on another plate of the set, thereby changing the combined width and/or the relative angle of the gripper arms to manipulate a cap adaptively disposed at the end of each vial. However, these uncapping apparatuses are usually very complex in structure, have long drive chains, and are therefore costly and the operation thereof is not easily controlled.

Therefore, there is a continuing need in the art for an uncapping apparatus that is structurally simple and reliable, has low overall costs, and is more easily automatically controlled.

SUMMARY

The present invention provides an uncapping apparatus for a test tube cap. The uncapping apparatus may comprise: a drive head, configured to engage with the test tube cap so as to drive the same, the drive head comprising at least two drive head elements, at least one of the drive head elements being rotatable about a rotary shaft, the drive head elements each comprising a first section that is close to the test tube cap when the drive head engages with the test tube cap and a second section that is located away from the test tube cap when the drive head engages with the test tube cap, and the first section and the second section being located on two opposite sides of the rotary shaft; an elastic element, configured to act on the second sections to provide a tensioning force to the drive head elements; and a switching element, configured to be movable between a first position and a second position, wherein in the first position, the second sections are under the action of the tensioning force of the elastic element to cause the first section to form a first drive head size, and in the second position, the switching element is capable of acting on the elastic element to change the tensioning force acting on the second sections, so that by means of the rotation of the drive head elements, the first sections form a second drive head size different from the first drive head size.

By means of the above uncapping apparatus, test tube caps of different sizes can be driven, particularly rotatably driven, by using a very simple structure, thereby improving the flexibility of operations such as uncapping, significantly improving the efficiency of experiments, reducing working time, and reducing costs. Adaptation to test tube caps of different sizes can be achieved by means of the switching element in the uncapping apparatus, and interaction between the switching element and the elastic element can open the drive head elements to different degrees, thereby achieving effective engagement with test tube caps of different sizes. In this way, it is not necessary to change to a different drive head when faced with a test tube cap of a different size.

Advantageously, the first sections can engage with the test tube cap from the inside thereof.

When the switching element moves to different positions, corresponding first sections of the drive head elements may be at different distances from each other, i.e. opened to different degrees. Such first sections can easily engage with the interior of the test tube cap so as to drive the same. Compared with external engagement, engagement of the drive head elements with the test tube cap from the inside allows the first sections to open to a smaller angle, thereby facilitating the configuration of the elastic element and the design of the sizes of the first sections and the second sections of the drive head elements, thus increasing the compactness of the overall tool apparatus. Furthermore, the corresponding test tube cap in this case may be internally recessed, thereby facilitating reduction in the overall material weight of the test tube cap.

Preferably, when the switching element moves between the first position and the second position, the tensioning force acting on the second sections may change continuously, so that the first sections are capable of forming a plurality of drive head sizes different from each other, thereby allowing engagement with different sized test tube caps so as to drive the same.

Movement of the switching element between different positions causes the tensioning force to change continuously, so that the degree to which the first sections can be opened can also change steplessly, thereby resulting in adaptability to more test tube caps (with continuously variable sizes, theoretically) and considerably high flexibility.

In particular, the switching element is implemented such that movement thereof between the first position and the second position may be translational movement in a direction towards or away from the test tube cap.

By means of the translational movement, the switching element can easily change the degree to which the first sections are opened. In particular, compared with conventional complex driving chains (for example, driving chains involving rotation or driving chains requiring cooperation between a plurality of components), such a structure is more efficient and less costly, and is more reliable.

Advantageously, the elastic element may be connected between the at least two drive head elements at the second section to provide an outward tensioning force thereto, and the switching element may externally surround the drive head elements, wherein as the switching element moves towards the elastic element, the switching element externally resists the tensioning force of the elastic element to act on the second sections, so that the second sections rotate inwards, and the first sections rotate outwards, so as to increase a drive head size.

The elastic element is provided inside of the drive head elements, and the switching element is arranged at the exterior the drive head elements, so that the elastic element and the switching element can be configured to be structurally simple, and the switching element has a wider movement range (compared to the reverse arrangement).

In particular, the switching element may be configured to be a switching plate, the switching plate comprises at least one through opening portion, the drive head extends through the through opening portion, and the switching plate is configured to be translationally movable along the drive head elements.

The structure of the switching element as a switching plate is very simple, and the through opening portion can be easily formed thereon to easily insert the drive head therein to achieve the switching function. Repair and replacement of the switching plate are also easy, and costs are low.

For example, the switching plate may comprise a plurality of through opening portions to accommodate a plurality of different drive heads, thereby allowing simultaneous engagement with a plurality of test tube caps.

By providing a plurality of through opening portions, simultaneous engagement with different test tube caps can be achieved by using different drive heads. In particular, as only one switching plate is present, the driving operation can be performed very easily on a plurality of test tube caps by vertically moving the same switching plate, and it is not necessary to provide different control devices to drive respective switching elements for respective test tube caps (even though the sizes of the test tube caps are the same).

Preferably, a bearing may be provided in the through opening portion so that the switching plate engages with the drive head elements by means of the bearing.

The configuration of the bearing minimizes the wear caused by movement between the switching element and the drive head, particularly between the drive head elements.

It is particularly preferred that the at least two drive head elements are configured to be hinged at the same rotary shaft, and are each rotatable about the rotary shaft when the acting tensioning force changes.

The drive head elements rotate about only one and the same rotary shaft, thereby resulting in a particularly compact overall structure.

For example, the drive head elements may be configured to be two clamping arms, and when the switching element is in the vicinity of the rotary shaft, the respective first sections of the two clamping arms make contact with each other and are closed under the action of the tensioning force of the elastic element, so as to form a minimum drive head size.

The elastic coefficient of the elastic element is designed to cause the distance between the clamping arms to be zero, thereby minimizing the drive head size. At which time, the drive head may be in a released state, i.e., not engaging with a test tube cap.

Furthermore, the uncapping apparatus may further comprise a driving device for driving the drive head to rotate, and the drive head may further comprise a mounting component for receiving and supporting the drive head elements and the rotary shaft, the mounting component being operatively connectable to the driving device.

The mounting component connected to the driving device is used to accommodate the drive head elements and the rotary shaft, thereby reducing the wear of the drive head elements, and facilitating the support of components.

The present invention further provides a method for using an uncapping apparatus to open a test tube cap. The uncapping apparatus may comprise a drive head. The drive head may comprise at least two drive head elements. The drive head elements may each comprise a first section that is close to the test tube cap when the drive head is close to the test tube cap and a second section that is located away from the test tube cap when the drive head is close to the test tube cap, and the first section and the second section are located on two opposite sides of a rotary shaft. The method may comprise: causing a switching element to move from a first position to a second position, wherein in the first position, the second sections are under the action of a tensioning force of an elastic element so that the first sections form a first drive head size, and the first sections having the first drive head size do not engage with the test tube cap, and in the second position, the switching element is capable of acting on the elastic element to change the tensioning force acting on the second sections, and at least one of the drive head elements rotates about the rotary shaft, so that the first sections can form a second drive head size different from the first drive head size, and the first sections having the second drive head size can engage with the test tube cap to drive the same to rotate to be uncapped.

By means of the above method, engagement with a test tube cap can be achieved by means of very simple and flexible operations, thereby performing uncapping efficiently.

The present invention further provides an uncapping apparatus for a test tube cap. The uncapping apparatus may comprise: a drive head, comprising a main body, the main body comprising a plurality of different sections in a longitudinal direction thereof, and the sections comprising a first section that is close to the test tube cap when the drive head is close to the test tube cap and a second section that is located away from the test tube cap when the drive head is close to the test tube cap, wherein the external size of the first section is smaller than that of the second section, so that the sections are capable of engaging with test tube caps of different sizes so as to drive the test tube caps from the inside thereof.

By means of the above uncapping apparatus, test tube caps of different sizes can be driven, particularly rotatably driven, by using a very simple structure, thereby improving the flexibility of operations such as uncapping, significantly improving the efficiency of experiments, reducing working time, and reducing costs. Furthermore, no movement components need to be provided, and flexible adaptation to test tube caps of different sizes can be achieved using only different sections of the main body of the drive head.

Advantageously, the first section may be configured to be immediately adjacent to the second section, and a plurality of protruding portions protruding outwards may be provided on the outer periphery of the second section.

The first section is immediately adjacent to the second section, so that the main body has a compact structure, and the protruding portions facilitate effective engagement with a test tube cap. Preferably, the protruding portions may deform to some extent when pressed.

Preferably, the sections may further comprise a third section configured to be immediately adjacent to the second section, and when the drive head is close to the test tube cap, the third section is further away from the test tube cap than the second section. The third section may comprise a plurality of frustoconical portions, and the frustoconical portions may respectively taper in a direction away from the second section. Thus, adaptation to test tube caps of a wider range of sizes can be achieved by means of the frustoconical portions, thereby improving the flexibility of driving the test tube caps.

Figure 1:
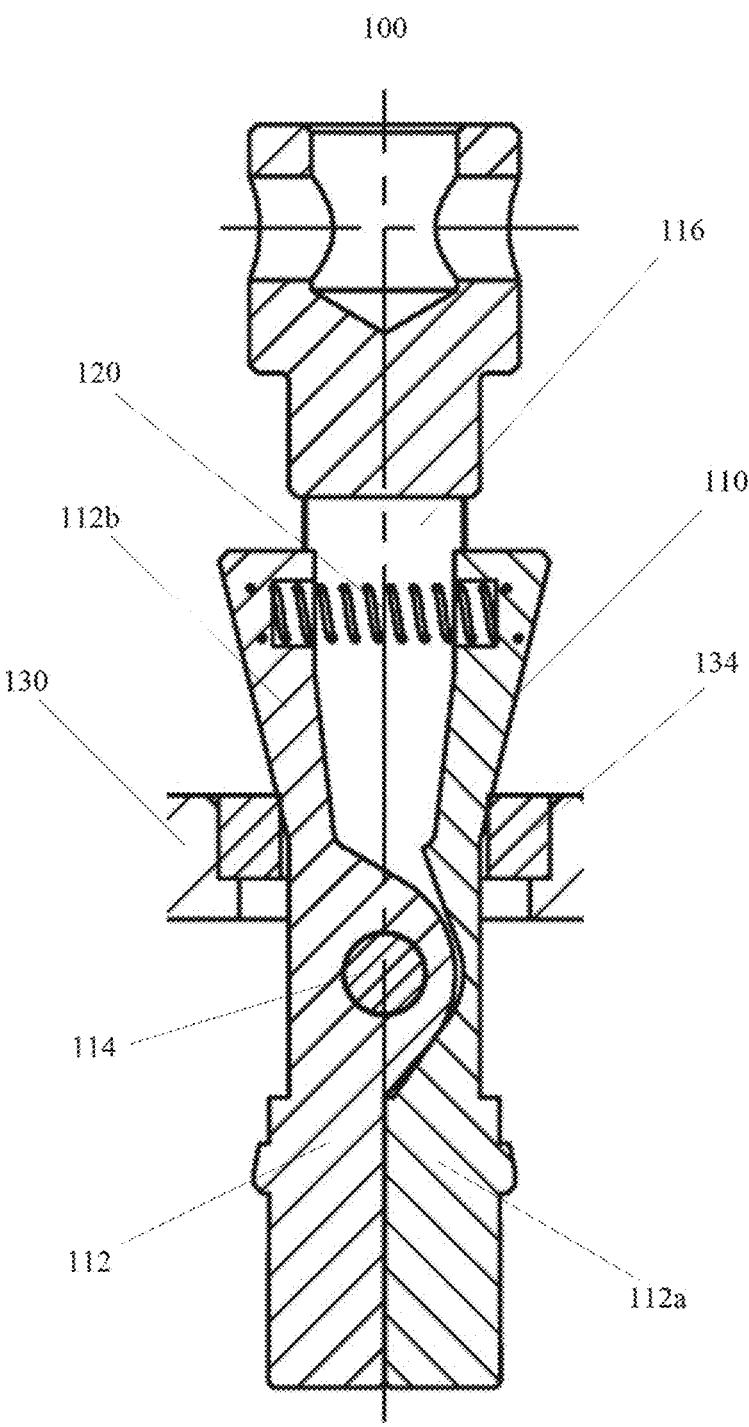
FIG. 1 schematically shows a cross-sectional side view of an uncapping apparatus according to an embodiment of the present invention, wherein a switching element is in a first position thereof.

LIST OF REFERENCE NUMERALS 100 uncapping apparatus;
110 drive head;
111 main body;
112 drive head element;
112a first section;
112b second section;
112c third section;
114 rotary shaft;
116 mounting component;
116a through hole;
116b accommodating opening;
117 protruding portion;
118 frustoconical portion;
120 elastic element;
130 switching element;
132 through opening portion;
134 bearing;
200 test tube cap.

DETAILED DESCRIPTION

The present invention will be further described below with reference to specific embodiments and the accompanying drawings, but the scope of protection of the present invention should not be limited thereby.

The present invention relates to an uncapping apparatus for a test tube cap. First, the test tube caps described in the present invention may encompass various test tube caps for closing or sealing test tubes in various fields (e.g., biology, medicine, chemistry, etc.). Although a test tube cap typically covers a test tube, the present invention is not so limited, and any test tube cap that can be rotated by means of the uncapping apparatus of the present invention, no matter whether the test tube cap is physically actually located on a test tube, falls within the scope of the present invention. In addition, in the present invention, the shape of the test tube cap is not generally limited, and the size of each test tube cap may be widely different.

Second, although the uncapping apparatus of the present invention is termed "uncapping", the functions of the apparatus of the present invention include, but are not limited to, complete uncapping, partial uncapping, partial capping, complete capping, translating a test tube cap, or any action for driving a test tube cap.

Third, in the present invention, the expressions "first", "second", "third", "fourth" and the like are merely used for distinguishing between, for example, different components and positions, (unless the possibility of being the same component or at the same position is otherwise specified), and do not imply that there is a difference in the order of precedence, or in the importance, priority, or the like.

Fourth, in the present invention, the expression "subjected to a . . . force" may mean at least being subjected to such a force, i.e., not excluding being subjected to (under the action of) other forces. The expressions "close to" and "away from" may be relative positional relationships, such as different sections closer to or away from a test tube cap, but this does not mean that "away from" is a significant distance from the test tube cap, and "close to" does not exclude a distance of zero from the test tube cap.

An uncapping apparatus 100 of the present invention may include a drive head 110. In the present invention, the term "drive head" refers to a portion of the uncapping apparatus that can engage with a test tube cap 200, but the term does not put any limitation on the shape of the portion of the uncapping apparatus. More specifically, the drive head 110 may be used to engage with the test tube cap 200 to drive the same (for example, to drive the same to rotate), so as to uncap the test tube, to cap the test tube with the test tube cap 200, or to perform other desired operations on the test tube.

In some embodiments of the present invention, the drive head 110 may include at least two drive head elements 112, preferably two, but three, or four, or more drive head elements 112 may also be provided. These drive head elements 112 are typically independent and separate from each other prior to assembly into the drive head 110.

The drive head 110 may further include at least one rotary shaft 114. The rotary shaft 114 preferably provides an axis of rotation oriented substantially parallel to the test tube cap 200. Here, the expression "parallel to the test tube cap" mainly means a direction parallel to a top surface of the cap or a direction parallel to a plane perpendicular to an axis of rotation of the test tube cap 200.

Figure 3:
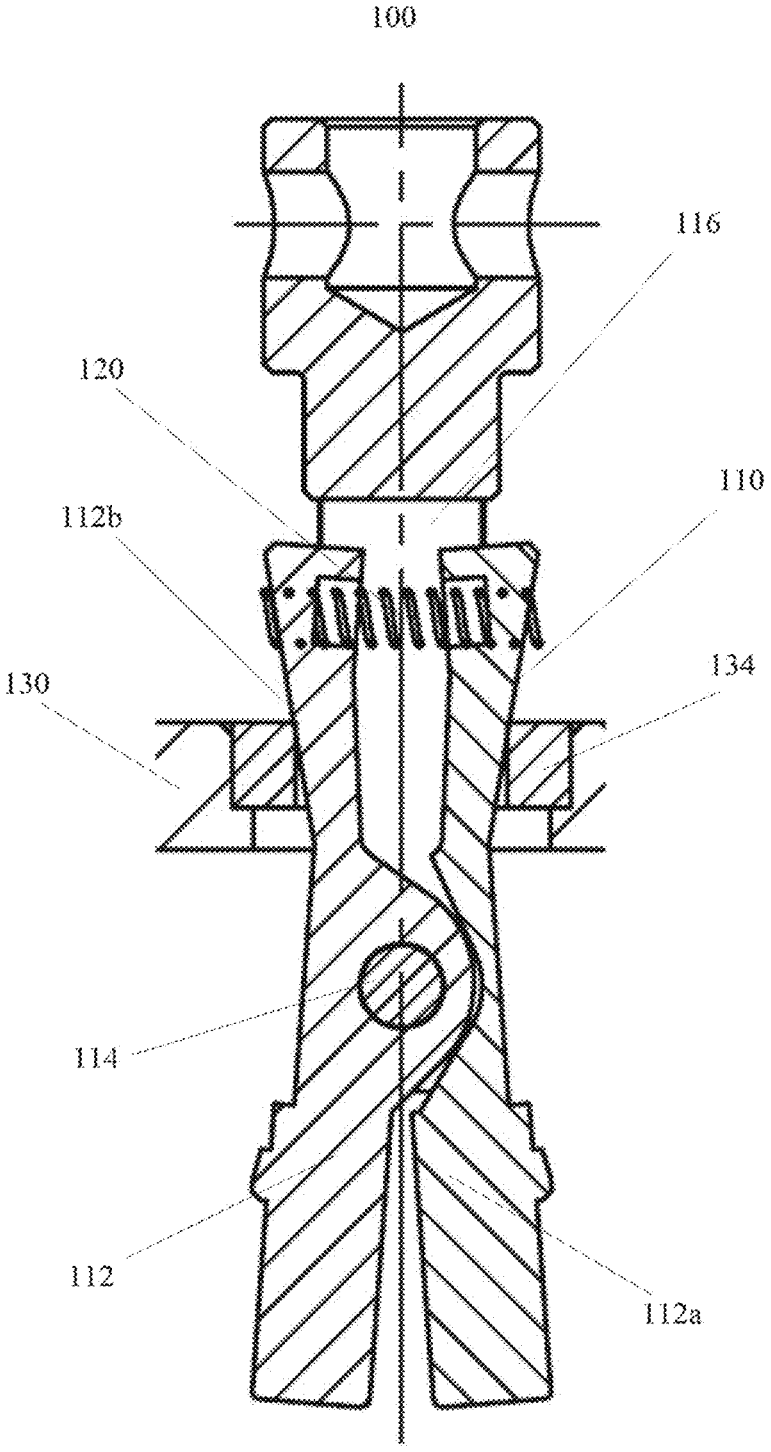
FIG. 3 schematically shows a cross-sectional side view of an uncapping apparatus according to an embodiment of the present invention, wherein a switching element is in a second position thereof.
Figure 4:
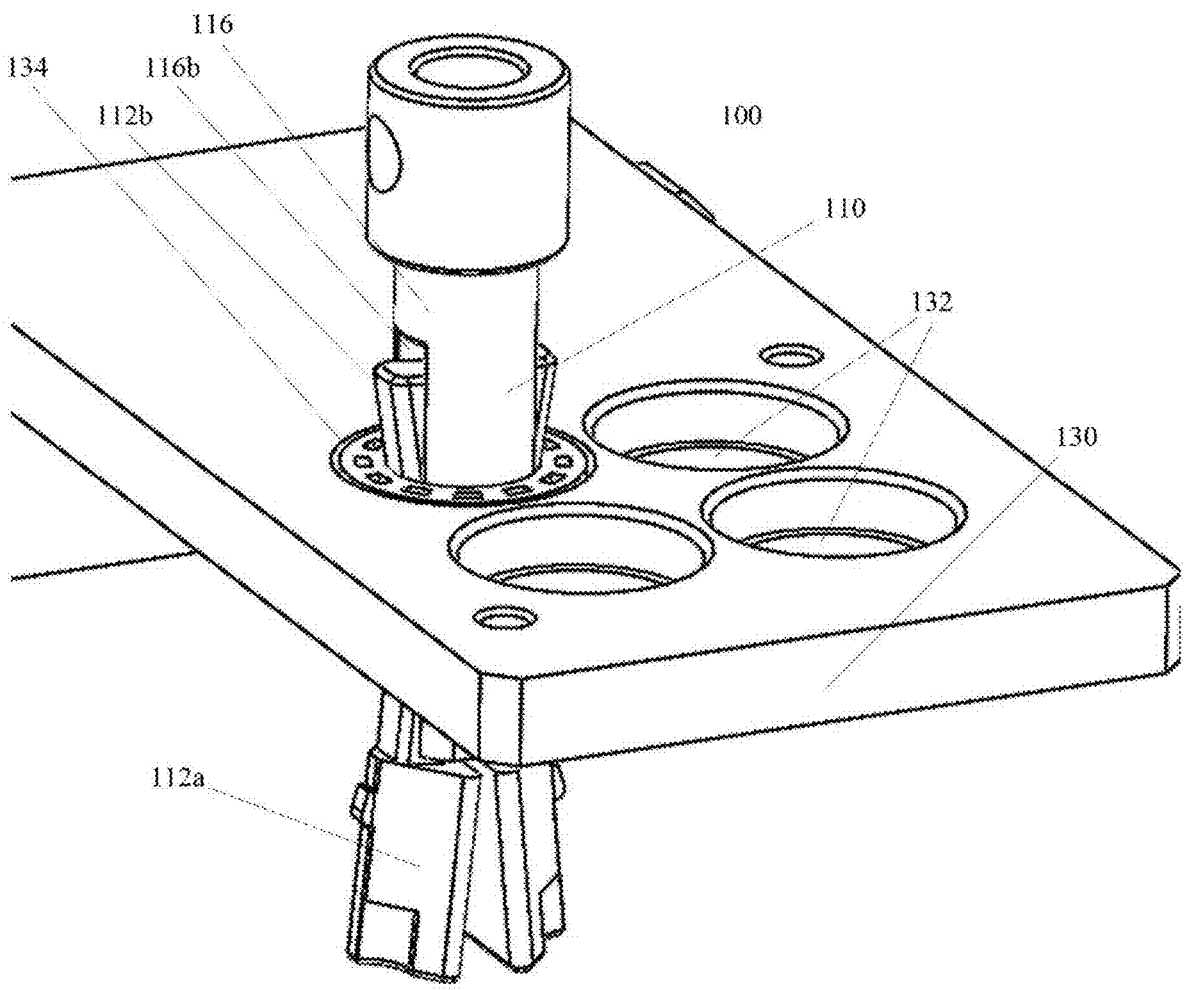
FIG. 4 schematically shows a perspective view of the uncapping apparatus according to the embodiment of FIG. 3, wherein the switching element is in the second position thereof.

In the drive head 110, at least one of the plurality of drive head elements 112 can rotate about the rotary shaft 114. In a preferred embodiment, the plurality of drive head elements 112 can rotate about respective rotary shafts 114. In a more preferred embodiment, the plurality of drive head elements 112 can rotate about the same rotary shaft 114, for example, each connected to the rotary shaft 114 so as to be rotatable about the rotary shaft, as shown in FIG. 1 and FIG. 3. It can be understood that relative movement between the plurality of drive head elements 112 may be present since at least one of the plurality of drive head elements 112 can rotate about the rotary shaft 114. For example, the at least one drive head element 112 rotating about the rotary shaft 114 may move relative to other drive head elements 112 that do not rotate. As another example, the plurality of drive head elements 112 rotating about the rotary shaft may also move relative to each other.

Figure 8:
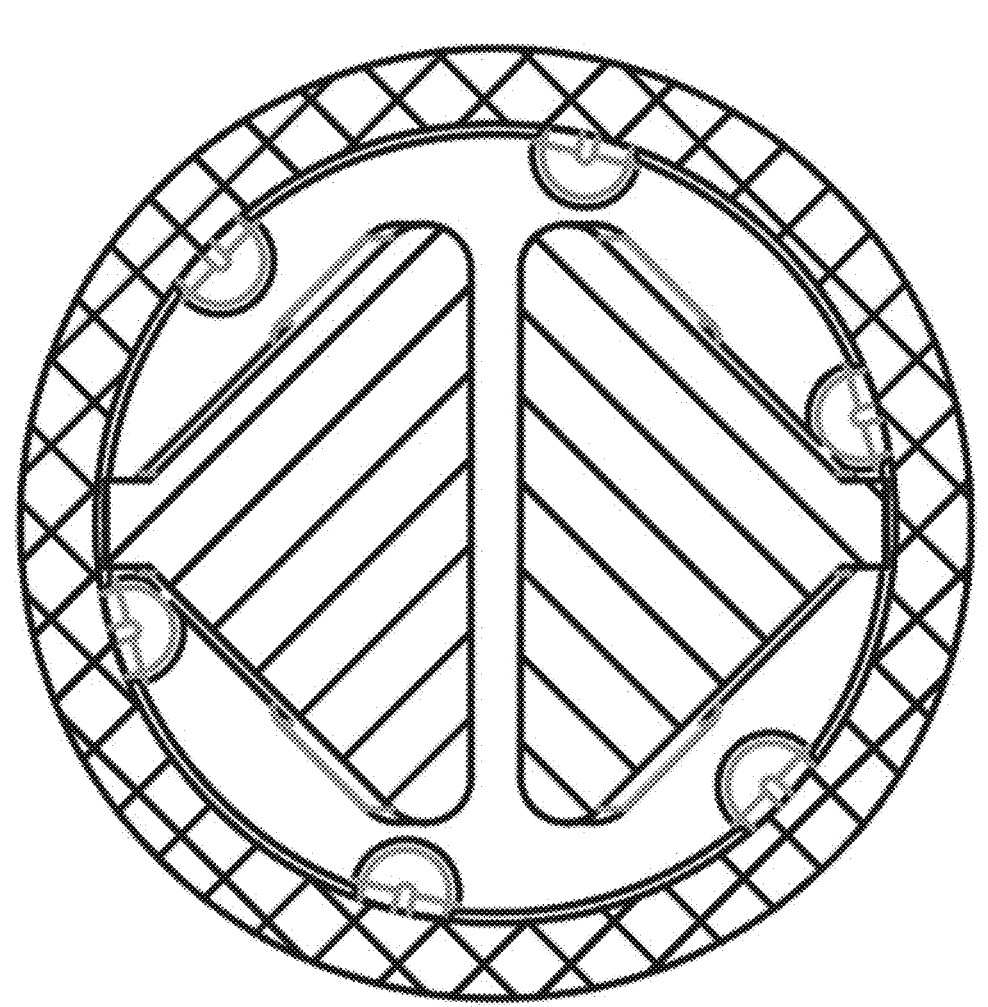
FIG. 8 schematically shows a cross-sectional view of the test tube cap engaging with the uncapping apparatus of FIG. 7.
Figure 9:
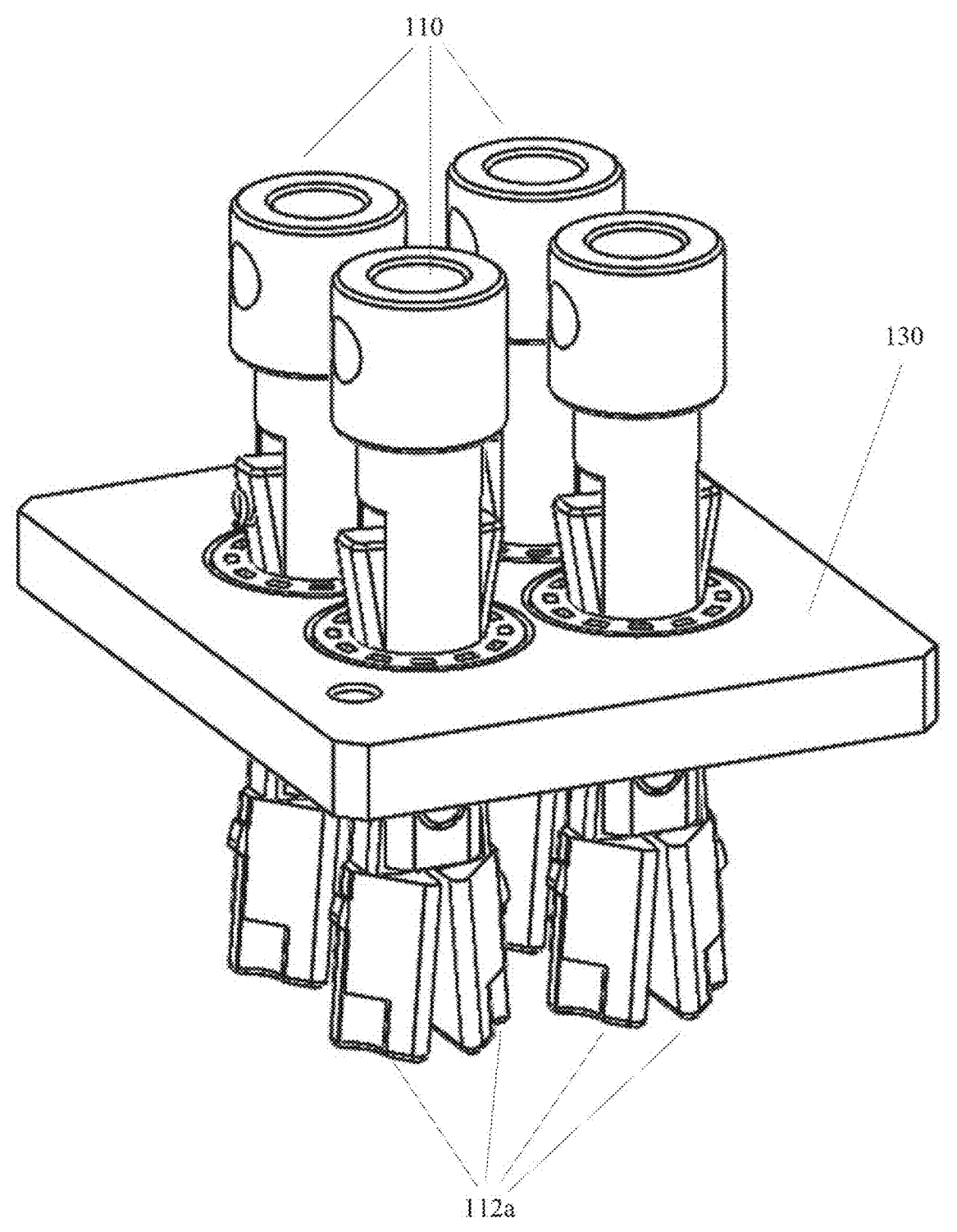
FIG. 9 schematically shows a perspective view of an uncapping apparatus according to an embodiment of the present invention, wherein a plurality of drive heads are inserted into corresponding through opening portions of a switching element.

Each of the plurality of drive head elements 112 respectively has a length in a direction substantially perpendicular to the rotary shaft 114. Preferably, the length dimension of the drive head elements 112 is greater than the dimensions in other directions (e.g., the radial dimension thereof). According to the present invention, each drive head element 112 may be divided into a plurality of sections along the length thereof. More specifically, while the drive head 110 is approaching (moving towards) the test tube cap 200 or when the drive head 110 is engaged with the test tube cap 200, each drive head element 112 may include a first section 112a that is close to the test tube cap 200 and a second section 112b that is located away from the test tube cap 200. An exemplary cross-sectional shape of the first section 112a is shown in FIG. 8, but the present invention is not limited thereto, and any shape suitable for engagement with the test tube cap 200 can be used. For example, if the drive head 110 moves downwards from above to gradually approach the test tube cap 200, then the first section 112a is located below the second section 112b. It can be understood that if the first section 112a of the drive head element 112 is inserted inside the test tube cap 200 in a certain depth to engage with the test tube cap 200, then no matter how close the second section 112b is actually to the test tube cap 200, the second section 112b is considered to be further away from the test tube cap 200 than the first section 112a is.

It is important that the first section 112a and the second section 112b of each drive head element 112 are located on two opposite sides of the rotary shaft 114, rather than on the same side thereof, because when the respective second sections 112b move towards each other, the corresponding first sections 112a move in the opposite direction, i.e., away from each other. Here, moving towards or away from each other does not mean that each of the plurality of drive head elements 112 has to move, but rather indicates the existent result of relative movement or relative displacement therebetween. It can be understood that the expression "located on two opposite sides of the rotary shaft 114" does not mean that each drive head element 112 having the first section 112a and the second section 112b must be rotatable about the rotary shaft 114, although this is a preferred solution. For example, if a drive head element 112 does not rotate about the rotary shaft 114, the first section 112a and the second section 112b thereof may also be located, relative to the rotary shaft 114, on two sides thereof, such as the upper side and the lower side. If the plurality of drive head elements 112 rotate about the respective rotary shafts 114, then the rotary shafts 114 referred to herein are the corresponding rotary shafts 114 about which the drive head elements 112 respectively rotate. In a preferred embodiment, one or more drive head elements 112 may be in the form of clamping arms, and the first section 112a and the second section 112b may correspond to two opposite sections of the clamping arm located on two sides of the rotary shaft 114 (e.g., the lower section and the upper section of the drive head element 112 as seen in FIG. 1 and FIG. 3), similar to two ends of a scissor or clamp structure. It can also be understood that the drive head element 112 may also include other sections along the length thereof in addition to the first section 112a and the second section 112b.

Although two drive head elements are shown in FIGS. 1-4, it can be understood that the drive head of the present invention may include more than two drive head elements. When there are more than two drive head elements, the drive head elements may be (preferably evenly) circumferentially distributed (resembling a claw). Advantageously, the mounting component (described in detail below) of the present invention may be configured to include structural features that match the more than two drive head elements, e.g., accommodating openings capable of accommodating a plurality of drive head elements, or the like.

The uncapping apparatus 100 of the present invention may further include an elastic element 120, in particular a spring, such as a coil spring. The elastic element 120 may be configured to act on the second section 112b of each drive head element 112, i.e., the section relatively further away from the test tube cap 200, so as to provide a tensioning force to the drive head element 112.

In the present invention, the term "tensioning force" includes an elastic force applied by the elastic element 120 to the drive head elements 112 (mainly by means the second sections 112b thereof), but the term itself does not limit the direction of the applied elastic force unless a direction (e.g., inward or outward) is explicitly defined before the term. For example, such a tensioning force may cause the second sections 112b of the respective drive head elements 112 to move away from each other (i.e., separated from each other) or towards each other (that is, approaching each other or even making contact with each other). However, as previously described, this does not require that the second section 112b of each drive head element 112 generates movement as long as there is relative movement therebetween. For example, one of the plurality of drive head elements 112 may be stationary.

In some embodiments, the tensioning force applied by the elastic element 120 to the second sections 112b of the drive head element 112 is a force that causes the second sections 112b to move outward (i.e., away from each other) or prevents the seconds section 112b from moving inward. In the preferred embodiment shown in FIGS. 1-4, the elastic element 120 may be connected between at least two drive head elements 112 at the second sections 112b to provide an outward tensioning force thereto. As shown in FIG. 1 and FIG. 3, the elastic element 120 is directly provided between corresponding respective second sections 112b of two drive head elements 112. Preferably, recesses opening towards each other may be provided in the second sections 112b of the drive head elements 112, and the elastic element 120 may be at least partially provided in these recesses or connected to the interior of these recesses. More preferably, the elastic element 120 may be arranged at or near free ends of the second section 112b located away from the test tube cap 200 or away from the first sections 112a, so as to generate larger torque. Advantageously, the magnitude of the tensioning force (e.g., determined at least by the elastic coefficient of the elastic elements 120) may be designed to maintain a certain larger distance between the second sections 112b of the drive head elements 112, so that the first sections 112a of the drive head elements 112 correspondingly have a smaller distance therebetween or even make contact with each other. As previously described, since the first section 112a and the second section 112b are located on two opposite sides of the rotary shaft 114, movement of the second sections 112b away from each other results in movement of the first sections 112a toward each other.

In other embodiments, the tensioning force applied by the elastic element 120 to the second sections 112b of the drive head elements 112 is a force that causes the second sections 112b to move inward (i.e., toward each other) or prevents the second sections 112b from moving outward. For example, the elastic element 120 may be configured to be connected to the exterior of the second sections 112b of the drive head elements 112 (e.g., the outer periphery surrounding and formed by the second sections 112b of the drive head elements 112), so as to externally apply an elastic force thereto. Preferably, recesses may be respectively provided in the second sections 112b of the drive head elements 112 on sides facing away from each other, and the elastic element 120 may be at least partially provided in these recesses or connected to the interior of these recesses. Advantageously, the magnitude of the tensioning force may be designed to maintain a smaller distance between the second sections 112b of the drive head elements 112, so that the first sections 112a of the drive head elements 112 correspondingly have a larger distance therebetween. As previously described, since the first section 112a and the second section 112b are located on two opposite sides of the rotary shaft 114, movement of the second sections 112b toward each other results in movement of the first sections 112a away from each other.

In the present invention, it should be noted that if the drive head elements 112 are further subjected to other forces in addition to the force applied by the elastic element 120 thereto, even though the force applied by the elastic element 120 may be unchanged, a resultant force (including the elastic force) acting on the drive head elements 112 will change, which, for simplification of description, is defined herein as a change in the "tensioning force" acting on the drive head elements 112.

The uncapping apparatus 100 of the present invention may further include a switching element 130 configured to actuate the drive head 110 to produce different drive head sizes. For this purpose, the switching element 130 can move between a first position and a second position. Here, moving between the two positions means that the switching element 130 can reach the first position and the second position, but the switching element 130 is not required to move continuously between the first position and the second position. Further, it can also be understood that the switching element 130 can further move to other positions in addition to the first position, the second position, and positions therebetween.

When the switching element 130 is in the first position, the second sections 112b of the drive head elements 112 are under the action of the tensioning force provided by the elastic element 120, so that the first sections 112a form a first drive head size. As previously described, this does not mean that the second sections 112b, at the time, must only be under the action of the elastic element 120, but that the second sections 112b, preferably, are mainly under the action of the elastic element 120. In addition, the first sections 112a are the sections of the drive head elements 112 that engage with the test tube cap 200, so that the first drive head size is substantially formed by the first sections 112a. Preferably, an outer (peripheral) size formed by corresponding respective ends of the plurality of first sections 112a directly facing the test tube cap 200 while the drive head 110 is approaching the test tube cap 200 may form the first drive head size (or a second drive head size that will be described below).

When the switching element 130 is in the second position, the switching element 130 can act on the elastic element 120 or, in other words, the second sections 112b, so as to change the tensioning force acting on the second sections 112b. The switching element 130 may act on the second sections 112b to change the amount of elongation of the elastic element 120, such as a spring, thereby changing the tensioning force. Since the tensioning force acting on the second sections 112b changes, relative movement between the corresponding respective second sections 112b of the plurality of drive head elements 112 occurs. Further, due to the presence of the rotary shaft 114, the relative movement between the second sections 112b, such as movement towards each other, causes the drive head elements 112 to rotate about the rotary shaft 114. As previously described, here, not every drive head element 112 is required to rotate, and only at least one drive head element 112 is required to rotate. By means of such rotation of the drive head elements 112, relative movement between the first sections 112a of the drive head elements 112 also occurs, thereby forming a second drive head size that is different from the above first drive head size.

Here, the second drive head size may be larger than the first drive head size. For example, when the tensioning force applied by the elastic element 120 to the second sections 112b is an outward force that causes the second sections 112b to move away from each other, and when the switching element 130 moves from the first position to the second position, the switching element 130 acts on the second sections 112b in a direction opposite to that of the elastic element 120, i.e., from the outside to the inside, so that the tensioning force acting on the second sections 112b is smaller than that when the switching element 130 is in the first position. Therefore, the second sections 112b move towards each other (i.e., rotating inward), and the first sections 112a move away from each other.

In other embodiments, however, the second drive head size may be smaller than the first drive head size. For example, when the tensioning force applied by the elastic element 120 to the second sections 112b is an inward force that causes the second sections 112b to move towards each other, and when the switching element 130 moves from the first position to the second position, the switching element 130 acts on the second sections 112b in a direction opposite to that of the elastic element 120, i.e., from the inside to the outside, so that the tensioning force acting on the second sections 112b is greater than that when the switching element 130 is in the first position (i.e., rotating outward). Therefore, the second sections 112b move away from each other, and the first sections 112a move towards each other.

Since movement of the switching element 130 can produce different drive head sizes, the uncapping apparatus 100 of the present invention achieve engagement with test tube caps 200 of different sizes by means of a very simple structure and operation method, and it is not necessary to provide different drive heads 110 for different test tube cap sizes, thereby significantly improving (e.g., experiment) efficiency, and reducing costs. Notably, in the present invention, the term "drive head size" does not mean that a drive head of the size must drive a test tube cap, but rather describes a drive capability (unless otherwise defined in the description). For example, the first drive head size can enable a test tube cap to be driven to rotate, but can also allow disengagement from a test tube cap to release the test tube cap.

In a more preferred embodiment, when the switching element 130 moves from the first position to the second position or vice versa, the tensioning force acting on the second sections 112b may change continuously. Thus, the first sections 112a can form a plurality of drive head sizes that are different from each other, thereby allowing engagement with more differently sized test tube caps 200 so as to drive the same. In particular, the plurality of different drive head sizes may vary continuously.

In an advantageous embodiment, the switching element 130 may be implemented such that movement thereof between the first position and the second position is translational movement in a direction of moving towards or away from the test tube cap 200 (e.g., the vertical movement shown in FIG. 1 and FIG. 3). Certainly, the switching element 130 of the present invention may also produce movement other than the translational movement, such as rotational movement or a combination of rotational movement and translational movement.

In some embodiments, the switching element 130 may perform the above translational movement along the exterior (e.g., the outer periphery) of the drive head elements 112. In other embodiments, the switching element 130 may also perform the above translational movement along the interior formed by the distance between the drive head elements 112. However, due to the presence of the rotary shaft 114, the range of the translational movement in the interior may be smaller than the range of the translational movement at the exterior. Preferably, the switching element 130 may translate only from a position at or near the rotary shaft 114 along the second sections 112b in a direction away from the test tube cap 200, or reversely move along the second sections 112b in a direction towards the test tube cap 200 to a position at or near the rotary shaft 114.

Figure 2:
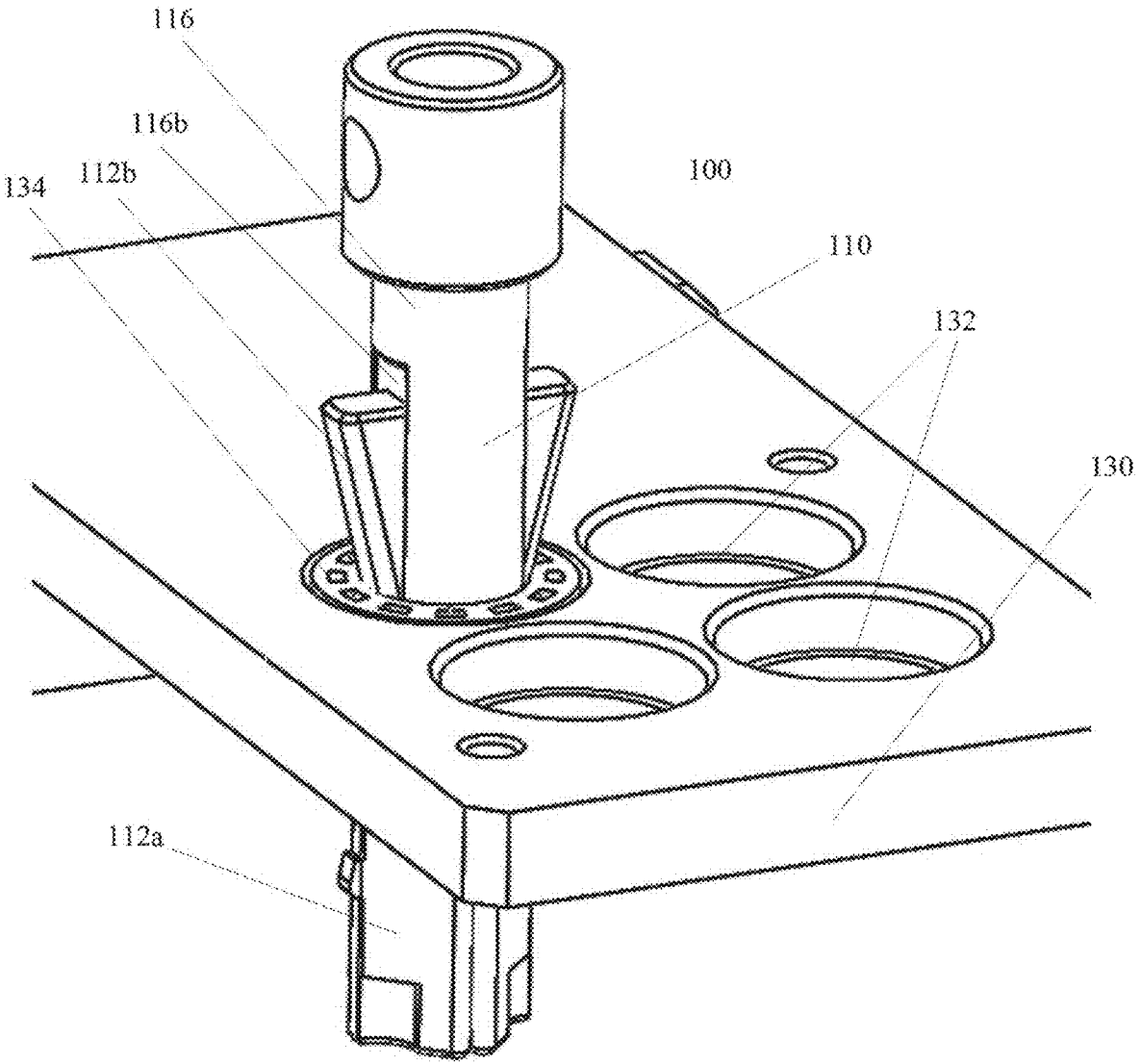
FIG. 2 schematically shows a perspective view of the uncapping apparatus according to the embodiment of FIG. 1, wherein the switching element is in the first position thereof.

As shown in FIGS. 1-2, when the switching element 130 is in the vicinity of the rotary shaft 114, the respective first sections 112a of the drive head elements 112 in the form of, for example, clamping arms may make contact with each other and be closed under the action of the tensioning force of the elastic element 120, so as to form a minimum drive head size. In the present invention, said minimum drive head size may generally be used to disengage the drive head 110 from the test tube cap 200, but the possibility of using the minimum drive head size for engagement with a test tube cap 200 of the minimum size is not excluded.

In a particularly preferred embodiment, as shown in FIG. 2, the switching element 130 may be configured to be a switching plate. Here, the term "switching plate" means that the size of the switching element 130 in a direction perpendicular to the translational movement (the horizontal direction shown in FIGS. 1-2) is much larger than the size thereof in the direction of the translational movement (the vertical direction shown in FIGS. 1-2), but the specific shape and size thereof are not limited in any way.

The switching plate of the present invention may include at least one through opening portion 132, and the drive head 110 may extend through the through opening portion 132. Thus, the switching plate may be configured to be translationally movable along (the outer periphery of) the drive head elements 112. From comparison between FIG. 1 and FIG. 3, it can be seen that the switching plate moves upwards along the second sections 112b from a position close to the rotary shaft 114. Advantageously, the switching plate acts on the drive head 110 (mainly the drive head elements 112) by means of a bearing 134. The bearing 134 is preferably a rolling bearing that can make contact with the exterior of the drive head elements 112.

As shown in FIGS. 2, 4, 5, and 9, the switching plate may include a plurality of through opening portions 132 to accommodate a plurality of different drive heads 110, thereby allowing simultaneous engagement with a plurality of test tube caps 200. In a specific example, the switching plate may include an opening portion array formed by the plurality of through opening portions 132 to correspond to test tubes commonly arranged in an array in laboratories and test tube caps 200 provided thereon, thereby achieving very high uncapping efficiency (or, test tube cap 200 driving efficiency). In particular, in this case, since only one switching plate is used, the required amount of translation of the switching plate can be designed for the same batch of test tubes, such that the drive head 110 can simultaneously engage with or disengage from a plurality of test tube caps

200. Certainly, the present invention does not rule out the possibility of providing different switching plates (typically smaller in size) for different test tube caps 200, thereby providing the flexibility of allowing different amounts of translation for the different test tube caps 200.

In the present invention, the drive head 110 may engage with the test tube cap 200 from the outside of the test tube cap, but it is more preferable for the drive head 110 to engage with the test tube cap 200 from the inside of the test tube cap. Hence, the first sections 112*a* of the drive head elements 112 may engage with the test tube cap 200 from the inside thereof. Here, the expression "engaging from the inside of the test tube cap" means that the drive head 110, mainly outer surfaces of the first sections 112*a* of the drive head elements 112, makes contact with inner surfaces of the test tube cap 200. That is, the test tube cap 200 has inner surfaces disposed opposite each other. It can be understood that the term "engagement" in the present invention refers to engagement to the extent of being capable of driving the test tube cap 200 to rotate, and includes, but is not limited to, a tight fit, an interference fit, or the like between the drive head 110 and the test tube cap 200.

Figure 7:
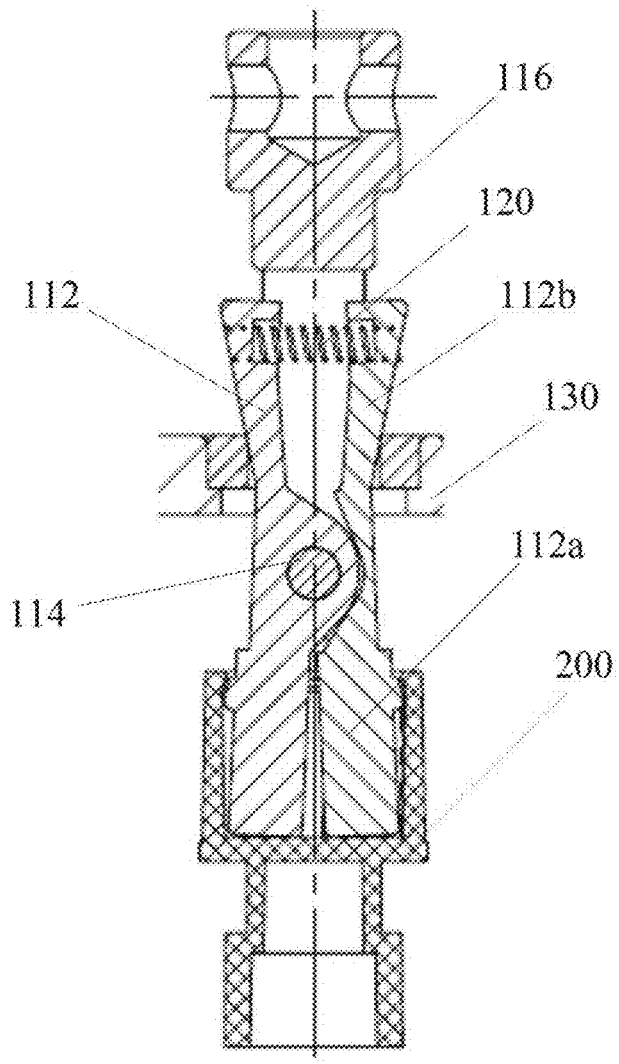
FIG. 7 schematically shows a cross-sectional side view of an uncapping apparatus according to an embodiment of the present invention, wherein the uncapping apparatus engages with a test tube cap.

In the embodiment shown in FIG. 7, the first sections 112*a* are in a certain open position in which the test tube cap 200 can be driven to rotate (i.e., the first sections 112*a* of the plurality of drive head elements 112 are not closed), and in said open position, the drive head elements 112 have a corresponding drive head size (e.g., the aforementioned second drive head size). The internal structure of an exemplary test tube cap 200 when engaging with the first sections 112*a* is further shown in FIG. 8, but the test tube cap 200 that can be used with the uncapping apparatus 100 of the present invention is not limited thereto, and may be a test tube cap 200 having any suitable shape and size.

The drive head 110 of the uncapping apparatus 100 of the present invention may further include a driving device for driving the aforementioned drive head 110 to rotate. To this end, the drive head 110 further includes a mounting component 116. The mounting component 116 is operatively connectable to the driving device. The mounting component 116 may also be configured to support a plurality of drive head elements 112. In some embodiments, the support component includes a through hole 116*a*, particularly a through hole 116*a* that extends substantially horizontally (when the drive head 110 is positioned vertically). The through hole 116*a* allows the rotary shaft 114 to pass therethrough. The drive head elements 112 can be rotatably or pivotally connected to the rotary shaft 114, and are thus also supported by the support component.

Figure 5:
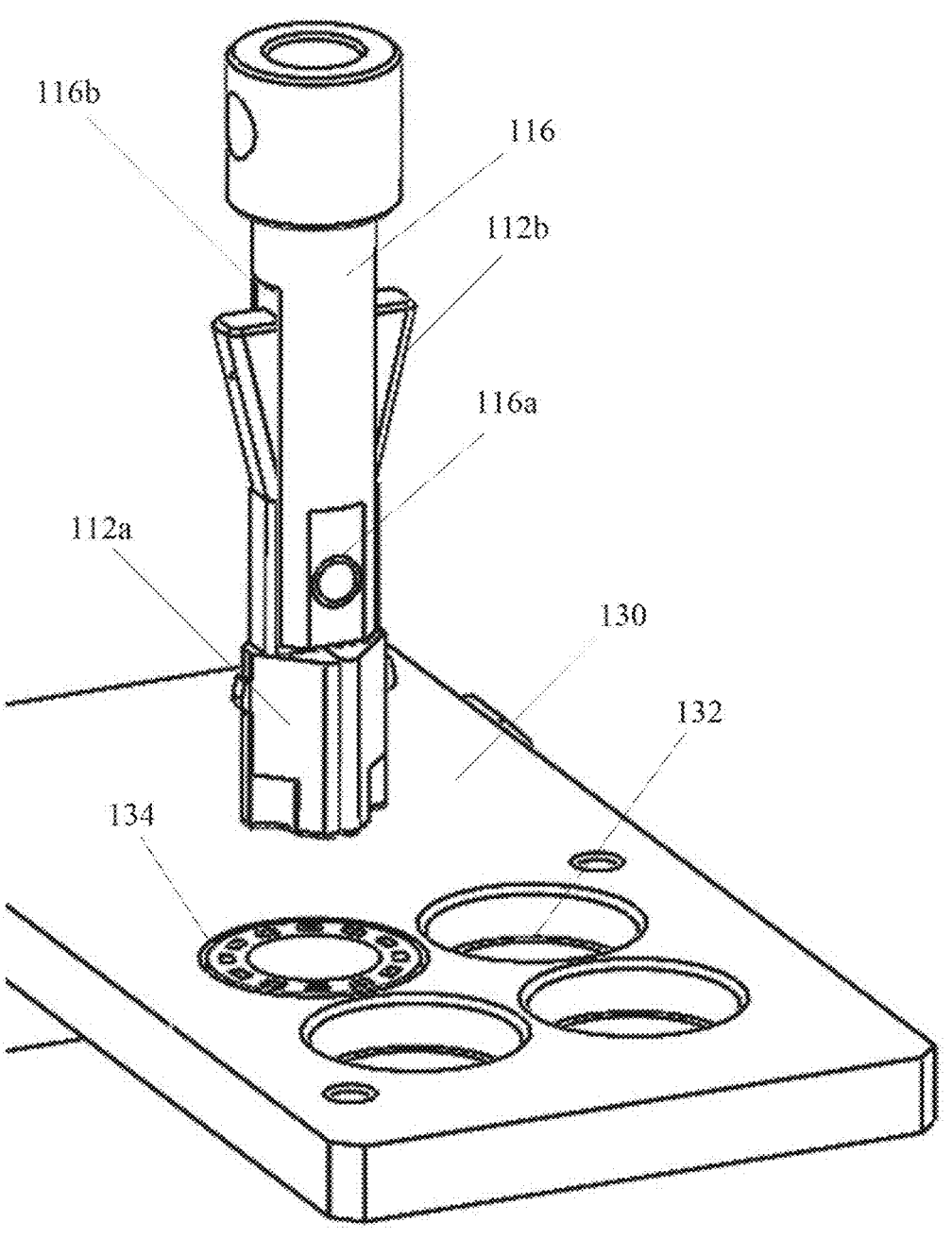
FIG. 5 schematically shows a perspective view of an uncapping apparatus according to an embodiment of the present invention, wherein a drive head is not inserted into a switching element.
Figure 6:
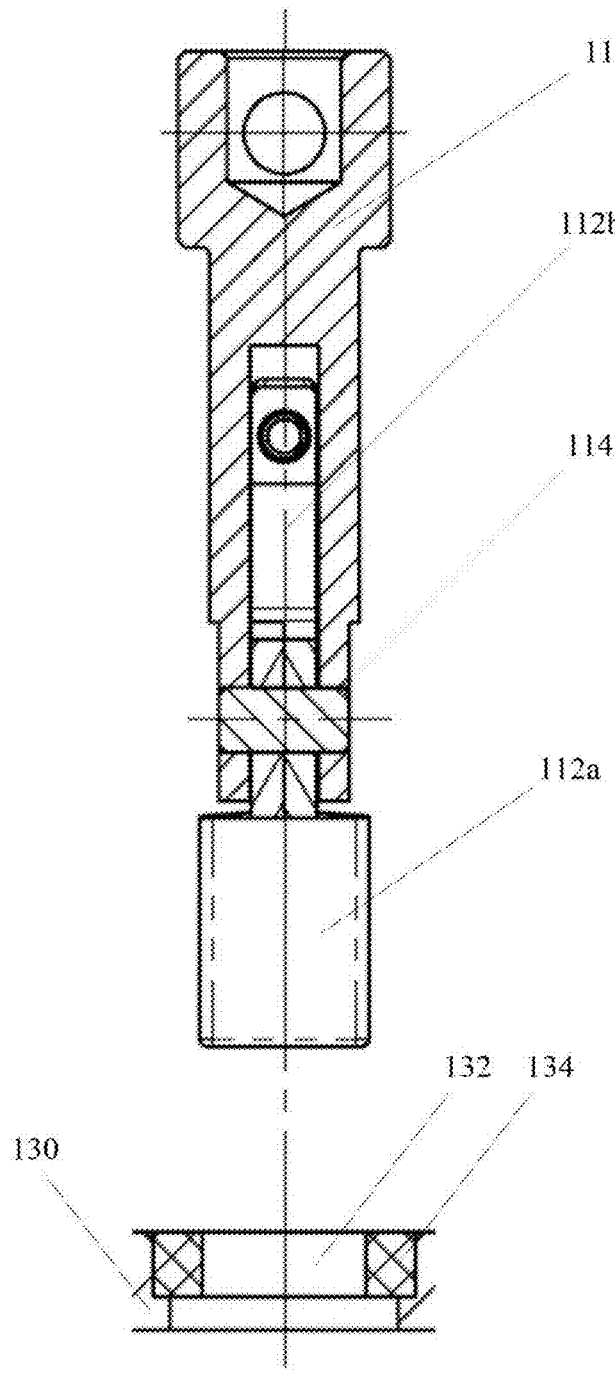
FIG. 6 schematically shows a side view of the uncapping apparatus according to the embodiment of FIG. 5, wherein the drive head is not inserted into the switching element.

In a preferred embodiment, the support component may be provided with accommodating openings 116*b* (also referred to as side openings) on two opposite sides thereof to accommodate two drive head elements 112 (as best shown in FIG. 5 and FIG. 6), but the support component of the present invention is not limited to the accommodating openings 116*b* corresponding to the two drive head elements 112. Advantageously, the drive head elements 112 may be provided partially inside the accommodating openings 116*b* and partially outside the accommodating openings 116*b*. In particular, the second sections 112*b* should at least partially be located outside the accommodating opening 116*b*, so that the switching element 130 can act on the exterior thereof. In addition, configuring the drive head elements 112 to be supported inside the mounting component 116 should not affect the movement thereof, for example, formation of various drive head sizes by the first sections 112*a* would not be affected.

As shown in FIG. 5, the drive head 110 has not yet been inserted into the switching element 130 in the form of the switching plate, and the mounting component 116 of the drive head 110 can be clearly seen. The mounting component 116 is substantially columnar, with a top portion having a structure (which will not be further described herein) matching the driving device, and a side surface provided with two openings for accommodating corresponding drive head elements 112. The rotary shaft 114 is horizontally disposed in the through hole 116*a* of the mounting component 116 to be connected to the drive head elements 112, so that the two drive head elements 112 can rotate about the rotary shaft 114. In this embodiment, the second sections 112*b* (which may be in the form of, for example, a jaw or a clamp) are both located substantially outside the mounting component 116, thereby facilitating engagement with the test tube cap 200. Although FIG. 5 shows that only one through opening portion 132 is provided with the bearing 134, it should be understood that the bearing 134, particularly a rolling bearing, which directly makes contact with the drive head 110, can be provided in any number of through opening portions 132.

An exemplary method for using an uncapping apparatus 100 to open a test tube cap 200 according to the present invention is described below with reference to FIGS. 1-4. In this method, the used uncapping apparatus 100 includes a drive head 110, an elastic element 120, and a switching element 130. Specifically, the drive head 110 includes at least two drive head elements 112. These drive head elements 112 each include a first section 112*a* that is close to the test tube cap 200 when the drive head 110 is close to or, in other words, engages with the test tube cap 200, and a second section 112*b* that is located away from the test tube cap 200 when the drive head 110 is close to or, in other words, engages with the test tube cap 200. The first section 112*a* and the second section 112*b* are located on two opposite sides of the rotary shaft 114.

When the switching element 130 is in a first position, the second sections 112*b* are under the action of a tensioning force of the elastic element 120, so that the first sections 112*a* located on the opposite side of the rotary shaft 114 can form a first drive head size, and the first sections 112*a* having the first drive head size may not engage with the test tube cap 200. In this case, the corresponding first sections 112*a* of the drive head elements 112 may make contact with each other, but may also be spaced apart from each other by a small distance. Due to disengagement from the test tube cap 200, in the first position of the switching element 130, the drive head cannot drive the test tube cap 200 to rotate, and may be referred to as being in a released state.

To perform uncapping, the method of the present invention includes causing the switching element 130 to move from the first position to a second position. In the second position, the switching element 130 can act on the elastic element 120 or, in other words, the second sections 112*b*, so that the tensioning force acting on the second sections 112*b* changes. As previously described, this does not mean that the switching element 130 definitely does not act on the elastic element 120 or, in other words, the second sections 112*b* when the switching element 130 is in the first position (certainly, it is also possible that a non-negligible effect is not generated), but that the tensioning force acting on the second sections 112*b* changes when the switching element 130 is in the second position. For example, when the switching element 130 is in the first position, the switching element 130 may externally apply an inward force to the second sections 112*b* (i.e., move the second sections 112*b* towards each other), and then the switching element 130 may translate upwards (e.g., move towards the free ends of the second sections 112b), so that the amount of elongation of the elastic element 120 is reduced, thereby enabling the second sections 112b to further move towards each other.

The position of the switching element 130 changes, so that the second sections 112b move relative to each other, and at least one of the drive head elements 112 can rotate about the rotary shaft 114. Therefore, the first sections 112a form a second drive head size different from the first drive head size, and the first sections 112a having the second drive head size can engage with the test tube cap 200 to drive the same to rotate to be uncapped. Here, the second drive head size is larger than the first drive head size. That is, the drive head 110 is in an engaged state.

Further, the drive head 110, the elastic element 120, the switching element 130, and other components in the previously described preferred embodiments of the present invention may also be used in conjunction with the method of the present invention described above. It should be noted that, although what is described above is the method for opening the test tube cap 200, it is also possible to perform driving in the opposite rotational direction to close the test tube cap 200. Furthermore, in other embodiments, the first sections 112a having the first drive head size may also engage with a test tube cap 200, but the size of said test tube cap 200 is different from (for example, smaller than) the size of the test tube cap 200 engaging with the first sections 112a having the second drive head size.

In other embodiments of the present invention, the drive head 110 of the uncapping apparatus 100 does not include at least two separate drive head elements 112, but has only one integrally formed drive head element 112. The one drive head element 112 may also be referred to herein as a main body 111 of the drive head 110. In these embodiments, the drive head 110 preferably engages with the test tube cap 200 from the inside thereof. As in the previous embodiments, the uncapping apparatus 100 in these embodiments may also include a driving device for driving the drive head 110, which is not described in detail herein. In addition, it should also be understood that the term "engagement" means engaged to the degree of being capable of driving the test tube cap 200 to rotate, and includes, but is not limited to, an interference fit, a tight fit, and the like.

The main body 111 of the drive head 110 may include a plurality of different sections in the longitudinal direction thereof or, in other words, the length direction thereof. Here, the longitudinal direction generally refers to a movement direction towards or away from the test tube cap 200 (e.g., the vertical direction shown in FIGS. 10-11), and the longitudinal direction is generally the length direction of the main body 111 of the drive head 110, that is, the size thereof in the length direction is generally larger than the radial size thereof.

Among the plurality of different sections, the main body 111 includes a first section 112a that is close to the test tube cap 200 when the drive head 110 is close to the test tube cap 200 and a second section 112b that is located away from the test tube cap 200 when the drive head 110 is close to the test tube cap 200. The external size of the first section 112a is smaller than that of the second section 112b. Thus, the first section 112a can engage with a test tube cap 200 that has a smaller internal size, whereas the second section 112b can engage with a test tube cap 200 that has a larger internal size. In other words, the respective sections of the main body 111 can engage with test tube caps 200 of different sizes, so as to drive each test tube cap 200 from the inside thereof, thereby achieving the flexibility of driving the test tube caps 200. Here, it can be understood that the first section 112a and the second section 112b do not need to be adjacent to or adjoin each other. That is, sections of other sizes may be interposed between the first section 112a and the second section 112b.

Figure 10:
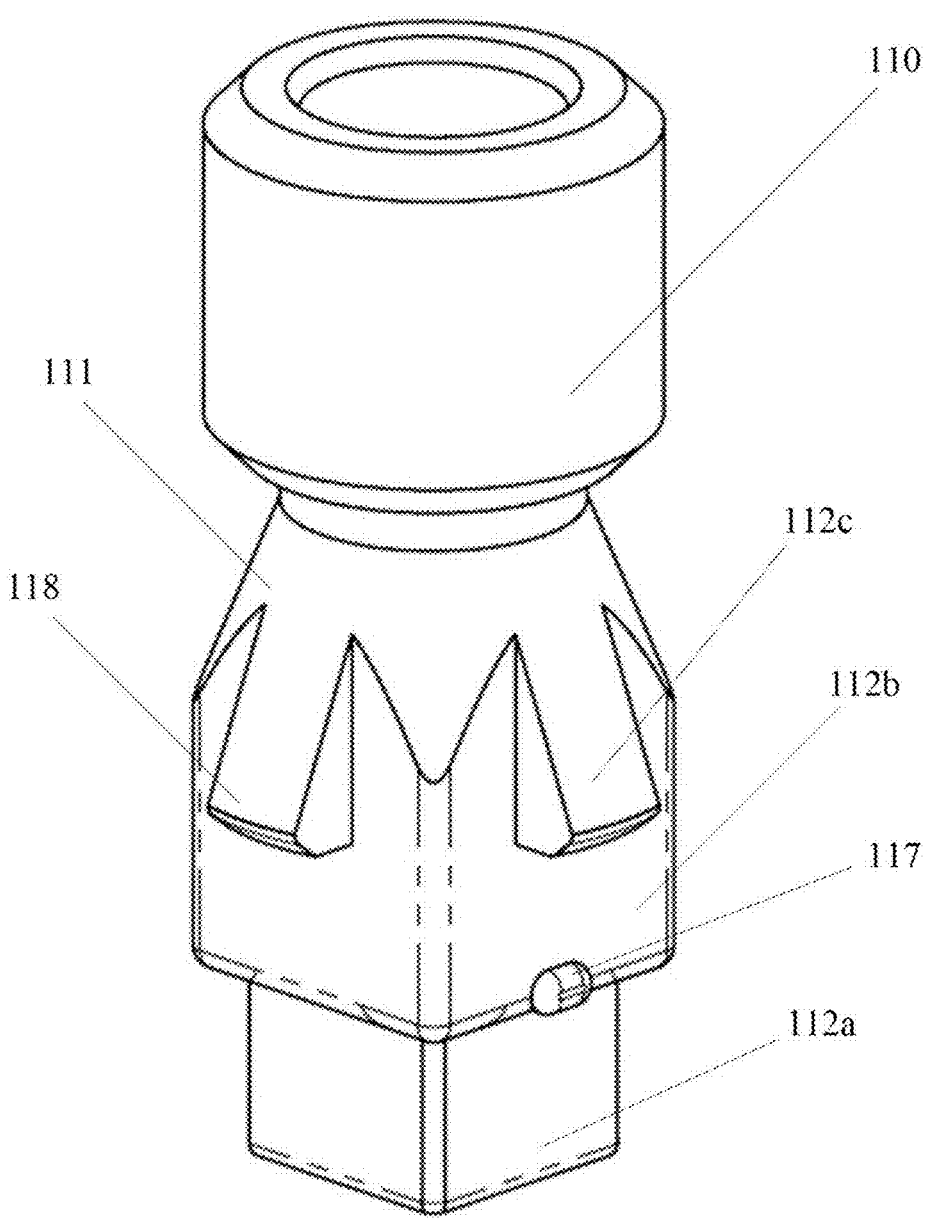
FIG. 10 schematically shows a perspective view of an uncapping apparatus according to an embodiment of the present invention.
Figure 11:
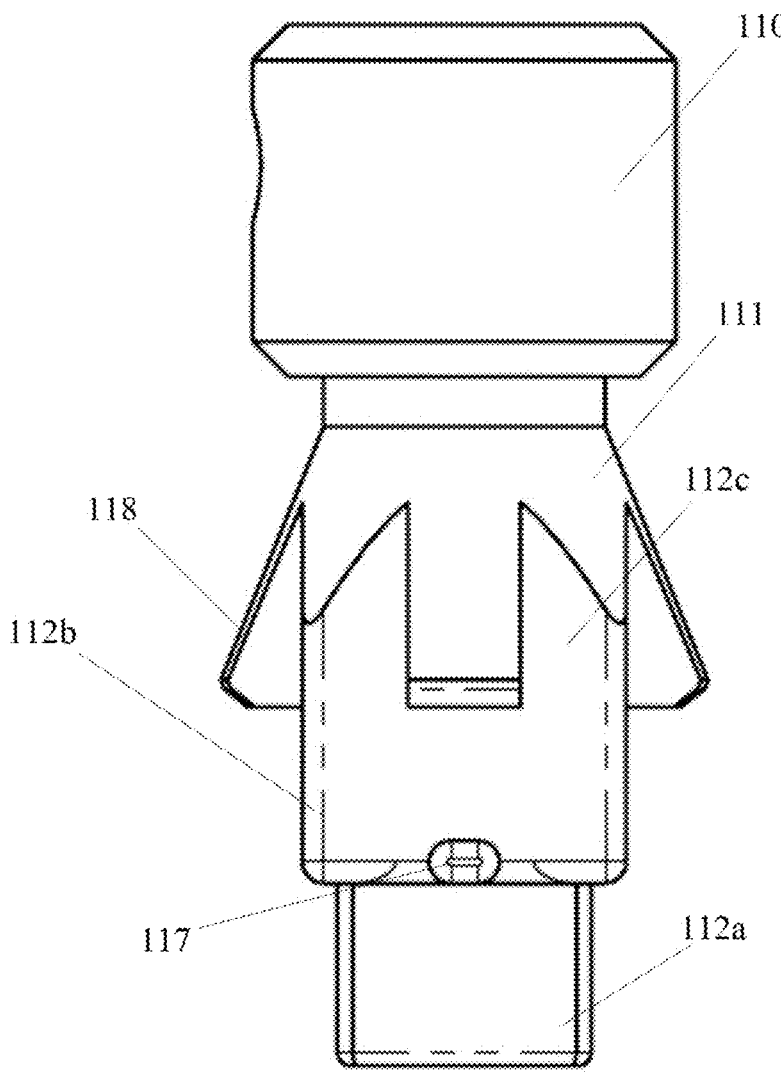
FIG. 11 schematically shows a side view of the uncapping apparatus according to the embodiment of FIG. 10.

In the embodiment shown in FIGS. 10-11, the first section 112a may be configured to be a square column, but is not limited thereto. For example, the first section 112a may also be a cylinder, or columns having other cross-sectional shapes, or even a hollow column. Advantageously, the second section 112b is configured to be immediately or directly adjacent to the first section 112a. For example, the second section 112b may also be configured to be a square column, but is not limited thereto. For example, the second section 112b may also be a cylinder, or columns having other cross-sectional shapes, or even a hollow column. In any case, however, the external size of the second section 112b should be larger than that of the first section 112a; for example, the cross-sectional size of the square column thereof is greater than the cross-sectional size of the first section 112a.

Figure 13:
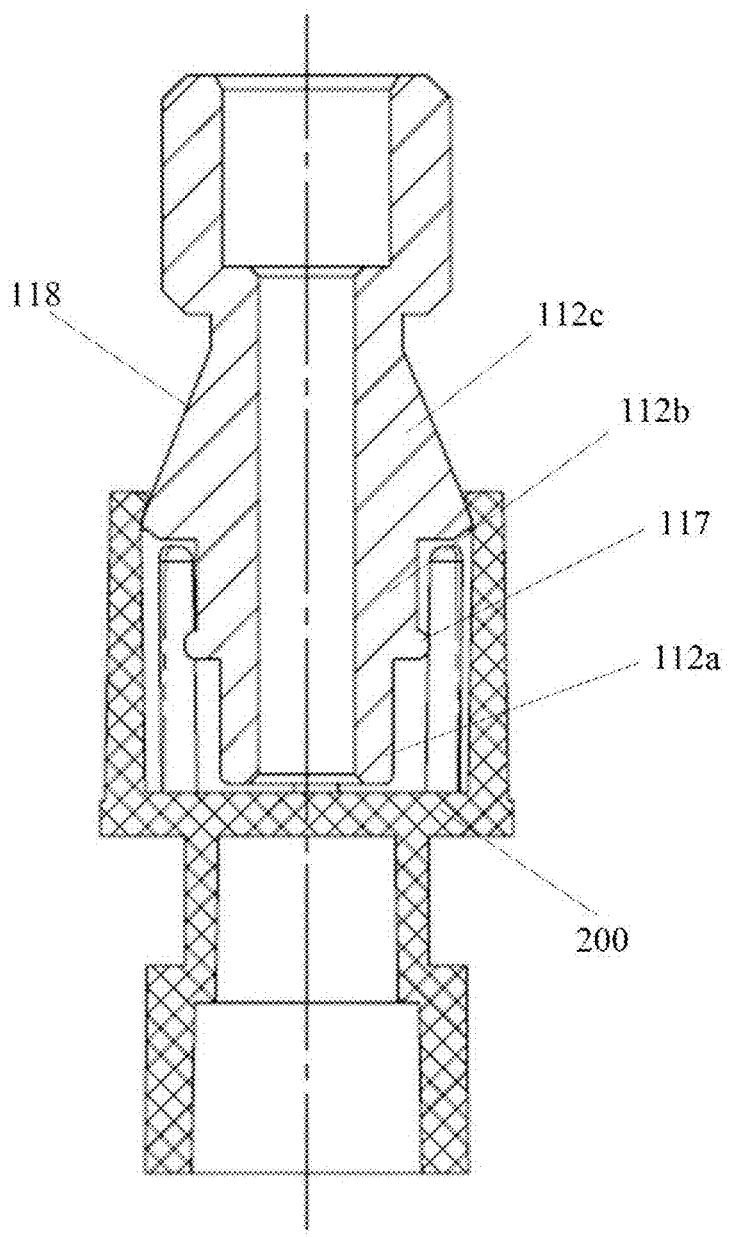
FIG. 13 schematically shows a cross-sectional side view of the uncapping apparatus according to the embodiment of FIG. 10, wherein the uncapping apparatus engages with the test tube cap.

Preferably, a plurality of protruding portions 117 or protrusions protruding outwards are provided on the outer periphery of the second section 112b, as best shown in FIGS. 10-11 and 13. In particular, these protruding portions 117 or protrusions may be provided symmetrically on opposite side surfaces of the second section 112b, for example, arranged at 180 degrees, but it is also conceivable that these protruding portions 117 or protrusions are provided on each side surface of the second section 112b in the form of a square column. More preferably, these protruding portions 117 or protrusions may be provided at positions on the second section 112b adjacent to the first section 112a. These protruding portions 117 or protrusions may engage with recesses inside the test tube cap 200 by means of shape mating.

In an advantageous embodiment, the main body 111 of the drive head 110 may further include a third section 112c. The third section 112c is configured to be further away from the test tube cap 200 than the second section 112b while the drive head 110 is approaching the test tube cap 200. Preferably, the third section 112c is configured to be immediately adjacent to the second section 112b. The third section 112c includes a plurality of protruding portions, and these protruding portions cause the external size of the third section 112c to be larger than that of the second section 112b. For example, each protruding portion of the third section 112c may be a portion outwardly protruding from an integral extending portion of the directional column of the second section 112b that extends in a direction away from the first section 112a. In particular, as shown in FIG. 11 and FIG. 13, the protruding portions of the third section 112c are configured to be frustoconical portions 118. The frustoconical portions 118 respectively taper in a direction away from the second section 112b, i.e., tapering upward as shown in the drawings. Preferably, the third section 112c includes one frustoconical portion 118 correspondingly provided on each one of the four side surfaces of the square column, and these frustoconical portions 118 may be connected to each other, or independent from each other.

In a specific embodiment shown in FIG. 13, the main body 111 of the drive head 110 includes: a first section 112a, also referred to as a lower section, configured to be a square column or a cube, and sized and shaped to engage with a test tube cap 200 having a circular inner hole; a second section 112b, also referred to as a middle section, configured to be

US 12,600,612 B2

Figure 12:
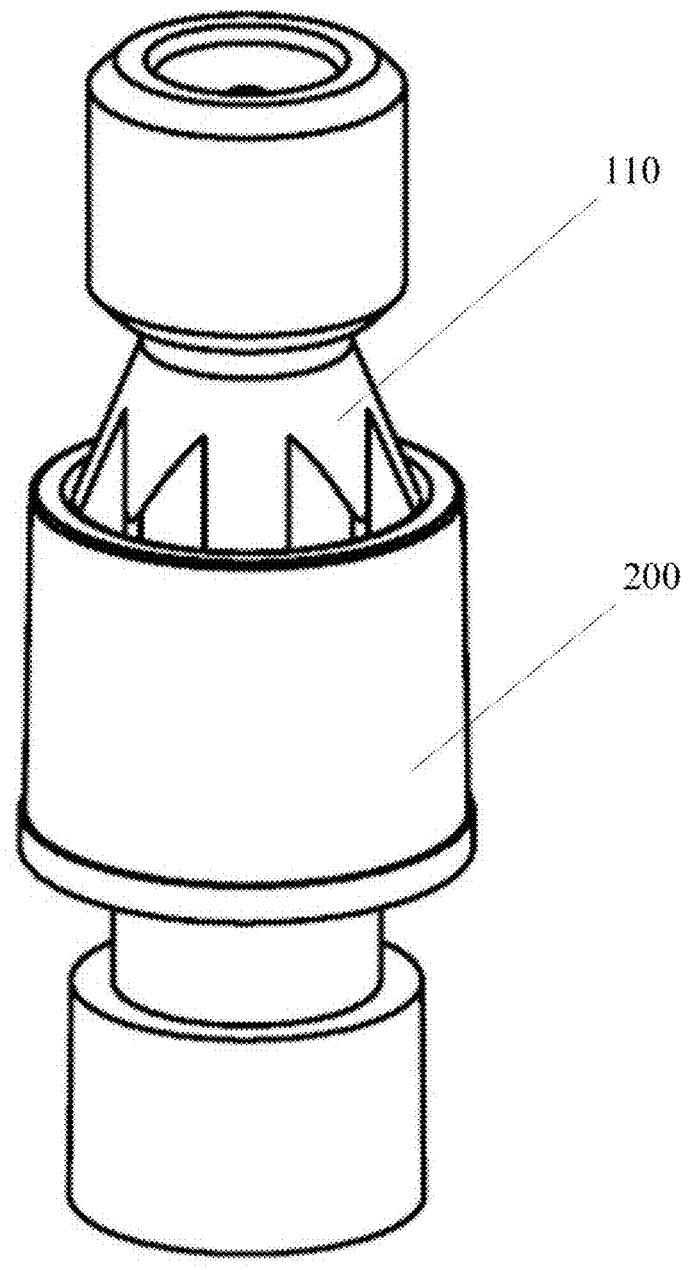
FIG. 12 schematically shows a perspective view of an uncapping apparatus according to an embodiment of the present invention, wherein the uncapping apparatus engages with a test tube cap.

17 a larger directional column or a larger cube, provided with two symmetrical protruding portions 117 or protrusions, and sized and shaped to engage with a test tube cap 200 having a square inner hole; and a third section 112c, also referred to as an upper section, comprising four symmetrical frusto-conical portions 118 which collectively act to engage with a test tube cap 200 having circular inner holes of different sizes (FIG. 12 shows an external view of the main body 111 of the drive head 110 when engaging with the test tube cap 200). Certainly, it can be understood that such a drive head 110 can engage with a test tube cap 200 having a shape different from those described above, but typically engages with the test tube cap 200 from the inside thereof.

Figure 14:
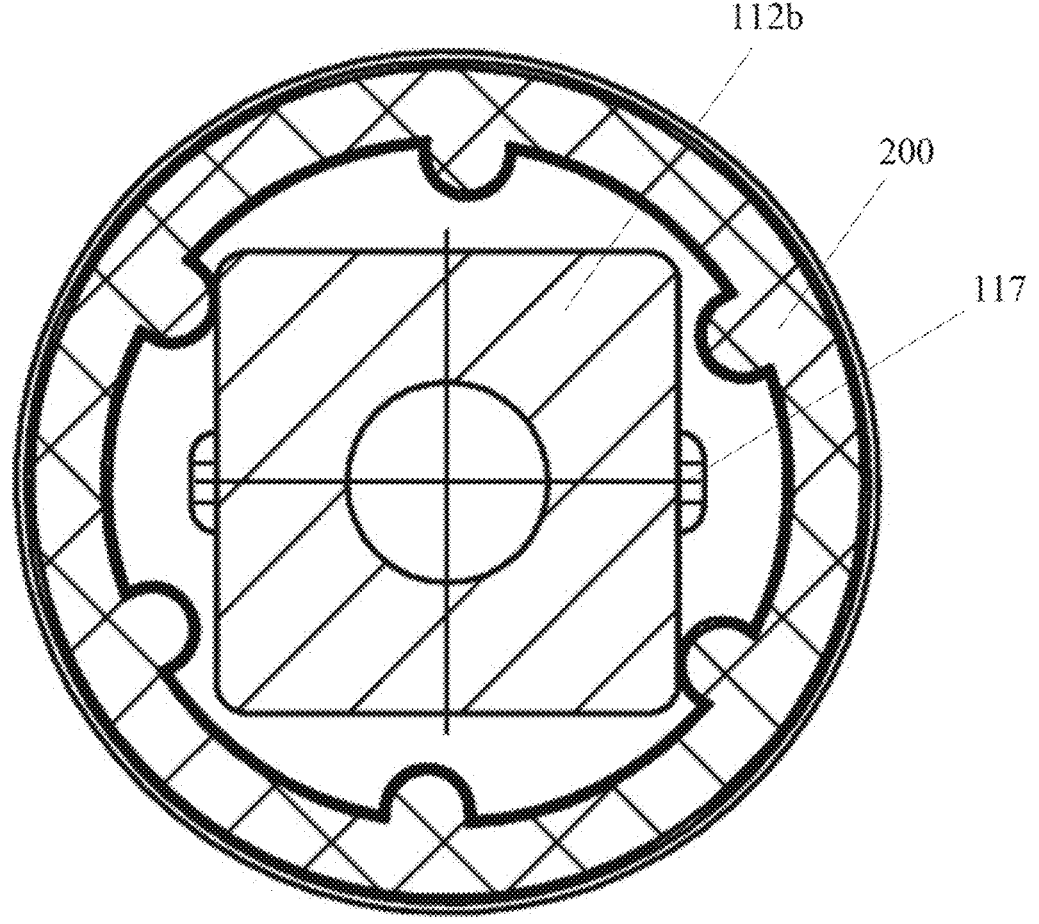
FIG. 14 schematically shows a top view of the test tube cap engaging with the uncapping apparatus of FIG. 12.
Figure 15:
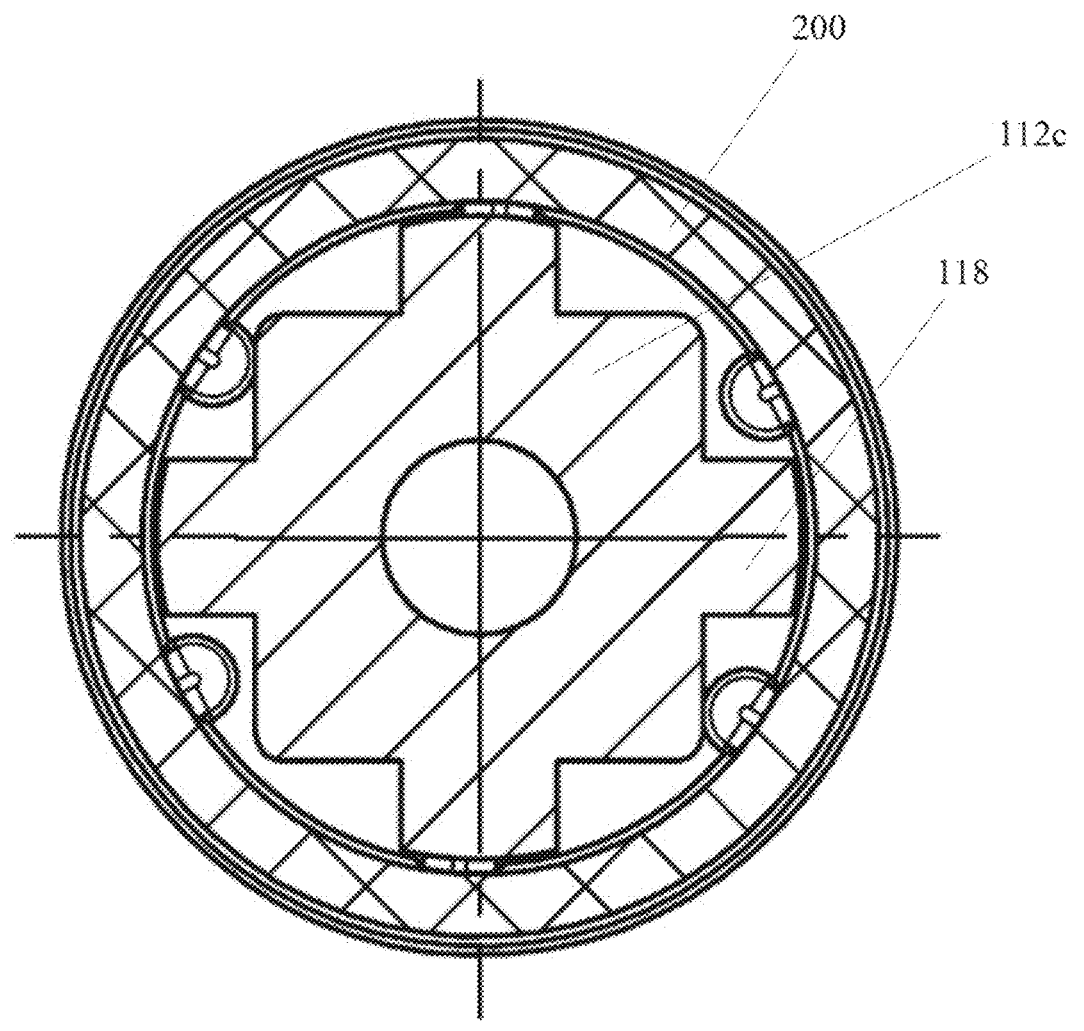
FIG. 15 schematically shows another top view of the test tube cap engaging with the uncapping apparatus of FIG. 12, wherein a third section of a main body engages with the test tube cap.

Although the above description describes that the sections of the column are axisymmetric and/or rotationally symmetric, it can be understood that the main body 111 of the drive head 110 of the present invention may make contact with or engage with an inner surface of a test tube cap 200 at symmetric or asymmetric positions. As shown in FIG. 14, a pair of diagonal corners of the second section 112b of the main body 111 make contact with and engage with a pair of protrusions located at diagonal corners inside the test tube cap 200. As shown in FIG. 15, all of the four frustoconical portions 118 of the third section 112c of the main body 111 make contact with and engage with the inner surface of the test tube cap 200. In addition, other portions of the third section 112c, for example, portions of the directional column may also make contact with and engage with the inner surface of the test tube cap 200. That is, for the present invention, the sections of the main body 111 may engage with a test tube cap 200 at a variety of positions thereon in order to meet the requirements for driving test tube caps 200 of different sizes to rotate.

Although various embodiments of the present invention are described mainly with reference to the uncapping apparatus and the uncapping method for engaging with a test tube cap from the inside in the accompanying drawings, it should be understood that the embodiments within the scope of the present invention may be applied to scenarios in which other test tube caps having similar structures and/or functions need to be driven to move.

The foregoing description has set forth numerous features and advantages, including various alternative embodiments, as well as details of the structures and functions of devices and methods. The description herein is intended to be illustrative, and not exhaustive or limiting.

It would be apparent to those skilled in the art that various modifications, particularly in aspects of structures, materials, elements, components, shapes, sizes, and arrangement of components, including combinations of these aspects within the scope of principles described herein, may be made to the full extent indicated by the broad general meaning of the terms expressed by the appended claims. To the extent that these various modifications do not depart from the spirit and scope of the appended claims, they are intended to be included herein.

The invention claimed is:

1. An uncapping apparatus for a test tube cap, comprising:
a drive head configured to drivingly engage with the test tube cap, the drive head comprising at least two drive head elements, at least one of the drive head elements being rotatable about a rotary shaft, the drive head elements each comprising a first section that is close to the test tube cap when the drive head engages with the test tube cap and a second section that is located away from the test tube cap when the drive head engages with the test tube cap, wherein the first section and the second section are located on two opposite sides of the rotary shaft, and wherein the first sections engage with the test tube cap from an inside thereof;
an elastic element configured to act on the second sections to provide a tensioning force to the drive head elements; and
a switching element configured to be movable between a first position and a second position, wherein in the first position, the second sections are under the action of the tensioning force of the elastic element to cause the first sections to form a first drive head size, and in the second position, the switching element is capable of acting on the elastic element to change the tensioning force acting on the second sections, so that by means of the rotation of the drive head elements, the first sections form a second drive head size different from the first drive head size.

2. The uncapping apparatus according to claim 1, wherein when the switching element moves between the first position and the second position, the tensioning force acting on the second sections changes continuously, so that the first sections are capable of forming a plurality of drive head sizes different from each other, thereby allowing engagement with different sized test tube caps so as to drive the same.

3. The uncapping apparatus according to claim 2, wherein the switching element is implemented such that movement thereof between the first position and the second position is translational movement in a direction towards or away from the test tube cap.

4. The uncapping apparatus according to claim 3, wherein the elastic element is connected between the at least two drive head elements at the second sections to provide an outward tensioning force thereto, and the switching element externally surrounds the drive head elements, wherein as the switching element moves towards the elastic element, the switching element externally resists the tensioning force of the elastic element to act on the second sections, so that the second sections rotate inwards, and the first sections rotate outwards, so as to increase a drive head size.

5. The uncapping apparatus according to claim 3, wherein the switching element is configured to be a switching plate, the switching plate comprises at least one through opening portion, the drive head extends through the through opening portion, and the switching plate is configured to be translationally movable along the drive head elements.

6. The uncapping apparatus according to claim 5, wherein the switching plate comprises a plurality of through opening portions to accommodate a plurality of different drive heads, thereby allowing simultaneous engagement with a plurality of test tube caps.

7. The uncapping apparatus according to claim 5, wherein a bearing is provided in the through opening portion so that the switching plate engages with the drive head elements by means of the bearing.

8. The uncapping apparatus according to claim 1, wherein the at least two drive head elements are configured to be hinged at the same rotary shaft, and are each rotatable about the rotary shaft when the acting tensioning force changes.

9. The uncapping apparatus according to claim 8, wherein the drive head elements are configured to be two clamping arms, and when the switching element is adjacent the rotary shaft, the respective first sections of the two clamping arms make contact with each other and are closed under the action of the tensioning force of the elastic element, so as to form a minimum drive head size.

10. The uncapping apparatus according to claim 1, wherein the drive head further comprises a mounting component for receiving and supporting the drive head elements and the rotary shaft, and the mounting component is operatively connectable to a driving device for driving the drive head to rotate.

11. The uncapping apparatus according claim 1, wherein the at least two drive head elements are configured to be hinged at the same rotary shaft, and are each rotatable about the rotary shaft when the acting tensioning force changes.

12. The uncapping apparatus according claim 2, wherein the at least two drive head elements are configured to be hinged at the same rotary shaft, and are each rotatable about the rotary shaft when the acting tensioning force changes.

13. The uncapping apparatus according claim 3, wherein the at least two drive head elements are configured to be hinged at the same rotary shaft, and are each rotatable about the rotary shaft when the acting tensioning force changes.

\* \* \* \* \*